United States Patent [19]

Simmons et al.

[11] 4,263,642
[45] Apr. 21, 1981

[54] DC TO DC CONVERTER

[75] Inventors: David H. Simmons, Palo Alto; Alfredo A. Panelo, San Jose, both of Calif.

[73] Assignee: Litton Systems, Inc., San Carlos, Calif.

[21] Appl. No.: 24,556

[22] Filed: Mar. 28, 1979

[51] Int. Cl.³ .............................................. H02M 3/335
[52] U.S. Cl. ........................................ 363/17; 363/39; 363/132
[58] Field of Search ...................................... 363/17–18, 363/20, 25, 39–40, 47, 97–98, 131–132; 307/105

[56] References Cited

U.S. PATENT DOCUMENTS

| | | |
|---|---|---|
| 3,582,754 | 6/1971 | Hoffman et al. ........................ 363/18 |
| 3,881,137 | 4/1975 | Thanawala ........................ 307/105 X |
| 4,017,784 | 4/1977 | Simmons et al. ........................ 363/17 |
| 4,063,306 | 12/1977 | Perkins et al. ........................ 363/132 X |
| 4,158,881 | 6/1979 | Simmons et al. ........................ 363/25 |

Primary Examiner—William M. Shoop
Assistant Examiner—Peter S. Wong

[57] ABSTRACT

A DC to DC converter having an input, an output, and a transformer coupling the input to the output. The converter includes circuit elements in the circuitry connected to the primary winding of the transformer which tune that circuitry to resonate at a first frequency and at the third harmonic of the first frequency so that the current which flows in the primary winding comprises alternating basically square wave pulses.

4 Claims, 4 Drawing Figures

DC TO DC CONVERTER

BACKGROUND OF THE INVENTION

1. Field of the Invention

This invention relates to power supplies and, more particularly, to DC to DC converters such as that described in U.S. Pat. No. 4,017,784 (issued to the assignee of this invention) in which the output voltage is regulated against variations in the input voltage. Such a DC to DC converter is often used to provide a high voltage DC output when only a low voltage DC source is available.

2. Description of the Prior Art

The DC to DC converter described in the above-mentioned patent contains a transformer having a primary and secondary winding and a predetermined leakage reactance existing between the primary and the secondary winding. A rectifier circuit is connected to the secondary winding and a large filter capacitance is connected to the rectifier to form an output across the filter capacitor adapted for connection to a load. A pair of electronic switches are connected across the input to the converter. A capacitor is included in series with the primary winding and voltage clamping diodes are connected across the primary winding to prevent voltage thereacross from exceeding a predetermined voltage level. Pulse generating means monitor the load voltage level and provide suitable pulses to the electronic switches to cause the switches to alternately conduct current through the capacitor and through the primary. The capacitive reactance of the capacitance is selected to bear a proper relationship to the inductance of the primary and the leakage reactance reflected from the secondary to provide a half sinusoid shaped current waveform through the primary during the operation of each switch. Furthermore, the periodicity of the pulses applied to the switches by the pulse generating means is increased or decreased as a function of the load voltage.

One of the limiting characteristics of such a converter is the amount of power which can be handled by the switching transistors. Since this power is limited by the peak current through the switching transistors, changing the primary circuitry so that the ratio of average to peak current is higher will allow greater total power to be handled by the converter.

It is an object of the present invention to provide a new and improved DC to DC converter.

It is another object of the present invention to provide a DC to DC converter having increased power handling capabilities.

It is still another object of the present invention to provide a DC to DC converter having unique pulse shaping characteristics in the primary circuitry.

SUMMARY OF THE INVENTION

The foregoing and other objects are accomplished in the present invention by a DC to DC converter such as that described in U.S. Pat. No. 4,017,784 having a unique two stage filter in series with the primary winding of the transformer for shaping the primary current to provide, essentially, a square wave. Such a primary current will have a higher average value and, consequently, will provide greater average power at the output.

Other objects, features, and advantages of the invention will become apparent from a reading of the specification taken in conjunction with the drawings in which like reference numerals refer to like elements in the several views.

DESCRIPTION OF THE PRIOR ART

Figure 1:
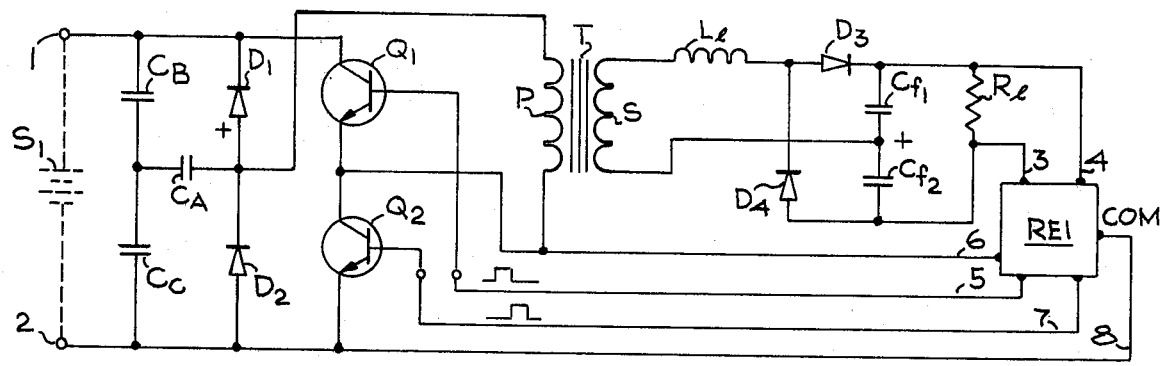
FIG. 1 is a circuit diagram of a prior art DC to DC converter.

In FIG. 1 is shown a prior art DC to DC converter. The converter is that disclosed in U.S. Pat. No. 4,017,784, assigned to the assignee of the present invention. In the converter shown in FIG. 1, a DC input voltage $S_1$ is connected across terminals 1 and 2. The input voltage is divided across identical capacitors $C_B$ and $C_C$. The input voltage is also applied across a pair of diodes $D_1$ and $D_2$ which are adapted to limit the voltage which may be applied across an input capacitor $C_A$ and consequently across a primary winding P of a transformer T. The primary circuit is completed by a pair of transistors $Q_1$ and $Q_2$ which provide alternate paths of application of input voltage across the primary P.

A secondary winding S of the transformer T having a leakage inductance $L_L$ (shown for descriptive purposes as an inductance in series with the secondary S) provides input across a load resistor $R_L$. Current is furnished to the load resistor $R_L$ through a pair of diodes $D_3$ and $D_4$ which are selected to rectify and provide alternate half waves of secondary current to the load $R_L$. The load is also connected across a pair of capacitors $C_{f1}$ and $C_{f2}$ which are connected together to the secondary winding S and to opposite ends of diodes $D_3$ and $D_4$. The circuit formed in the secondary is a full wave voltage doubler circuit, well known in the art, which allows the output of both the capacitors $C_{f1}$ and $C_{f2}$ to be applied in series across the load $R_L$. Such a secondary is especially appropriate when it is desired to increase the voltage output in the secondary as in some types of DC to DC converters. Other well known types of rectifying circuits could be provided in the secondary, however.

An output is taken across the load $R_L$ on conductors 3 and 4 and is furnished to a regulator $RE_1$. The regulator $RE_1$ is described in U.S. Pat. No. 4,017,784 and provides alternating pulses to the bases of the transistors $Q_1$ and $Q_2$ to turn them on for selected periods. When the transistor $Q_1$ is turned on by a pulse at its base, current flows in its emitter-collector circuit and through the primary P. When the transistor $Q_1$ is turned off by removal of the enabling pulse furnished by the regulator $RE_1$ and the transistor $Q_2$ is turned on by a pulse at its base, current flows in the emitter-collector circuit of the transistor $Q_2$ and in an opposite direction through the primary P of the transformer T. As is explained in the above-mentioned patent, the value of the capacitor $C_A$ and the leakage inductance $L_L$ of the secondary winding S reflected by the transformer T to the primary circuit are selected such that the waves furnished to the primary P by each of the transistors $Q_1$ and $Q_2$ are alternate halves of a sinusoid.

Obviously, the power which the transistors $Q_1$ and $Q_2$ of FIG. 1 may carry is limited by the peak value of the primary current which is carried by each of these transistors.

DESCRIPTION OF THE PREFERRED EMBODIMENT

Figure 2:
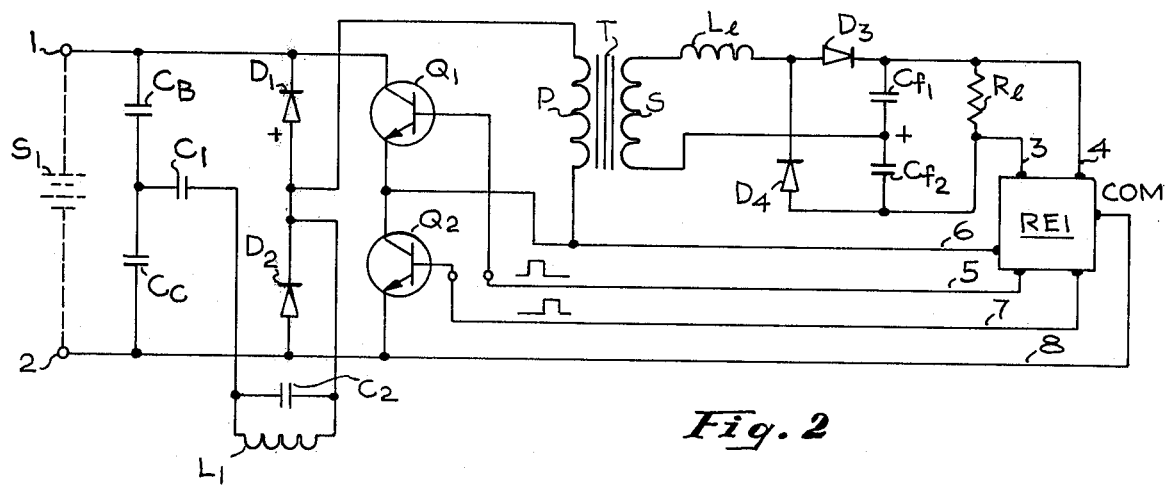
FIG. 2 is a circuit diagram of a first embodiment of a DC to DC converter constructed in accordance with the invention.

Referring now to FIG. 2, there is shown an improved DC to DC converter constructed in accordance with the invention. The DC to DC converter of FIG. 2 is constructed much like that of the prior art circuit shown in FIG. 1 but has certain characteristics which will allow it to carry an increased amount of power. The converter comprises a DC power supply $S_1$ shown in phantom connected between terminals 1 and 2. A pair of capacitors $C_B$ and $C_C$ are connected across the power supply $S_1$. These capacitors are of equal value so that the input voltage is divided equally thereacross. Also connected to terminals 1 and 2 are a pair of transistors $Q_1$ and $Q_2$. The transistor $Q_1$ has its collector connected to the terminal 1, its emitter connected to the collector of transistor $Q_2$ and to the primary of a transformer T, and its base connected to a regulator circuit $RE_1$. Transistor $Q_2$ has its collector connected to the primary P of the transformer T, its base connected to the regulator circuit $RE_1$, and its emitter connected to the terminal 2. A pair of diodes $D_1$ and $D_2$ are connected across the terminals 1 and 2 and have the effect explained in the prior art patent mentioned above of limiting the voltage applied to the primary winding P.

Figure 4:
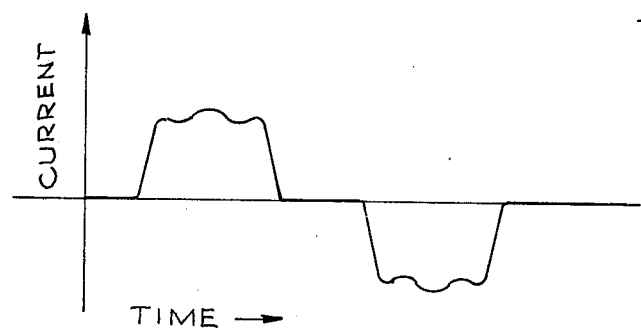
FIG. 4 is a graphic illustration of a current waveform in the primary winding of a transformer used in the invention of FIGS. 2 and 3.

The input capacitor $C_A$ shown in FIG. 1 of the prior art DC to DC converter is replaced in the configuration of FIG. 2 by a circuit including in series a capacitor $C_1$ connected between the capacitor $C_B$ and $C_C$ and a capacitor $C_2$ and an inductor $L_1$ connected in parallel to each other. The values of the capacitors $C_1$ and $C_2$ and of the inductor $L_1$ are so chosen that with the inductance of the primary winding P, the reflected inductance $L_L$ from the secondary, and the remaining circuitry a two-stage filter is provided. The filter is such that at the primary frequency of operation of the circuitry (i.e., the frequency at which the time of conduction of transistors $Q_1$ and $Q_2$ represents one half wavelength), the primary will be series resonant. Furthermore, the primary circuit will also be series resonant at approximately three times the frequency at which the configuration of FIG. 2 is operating. This two stage selective filter in the primary causes a primary current waveform approximating that shown in FIG. 4. As will be seen, the ratio of peak current to average current for FIG. 4 is substantially less than is the ratio of peak current to average current in the sinusoidal waveform. Consequently, the average current may be raised through the transistors $Q_1$ and $Q_2$ without causing damage to the transistors and the circuit may handle a substantially greater amount of power. In a particular circuit constructed in accordance with the invention, approximately 900 watts of power are handled at the output in contrast to a circuit constructed in accordance with FIG. 1 which carries approximately 750 watts at the output for essentially identical component values.

A particular circuit as shown in FIG. 2 constructed in accordance with the invention may utilize components of the following values:

$C_B$, $C_C$—135 microfarads
$C_1$—0.611 microfarads
$C_2$—0.360 microfarads
$L_1$—10.54 microhenrys
$L_L$—23.66 microhenrys Such components will provide an impedance ratio to current at the primary frequency of 27 k.c. to current at the third harmonic of 1/4.634.

As with the circuit described in FIG. 1, the circuit of FIG. 2 has a secondary winding S as a part of the transformer T which includes a leakage inductance $L_L$ shown in the circuit of FIG. 2 as a separate inductor only for the purposes of explanation. This leakage inductance $L_L$ is reflected by the transformer T to the primary winding P and is adapted to cooperate with the capacitances $C_1$ and $C_2$ and the inductor $L_1$ to provide the particular tuning desired. The secondary circuit also includes a pair of diodes $D_3$ and $D_4$ connected to the upper terminal of the winding S and to opposite sides of a load $R_L$. The lower terminal of the winding S is connected between a pair of capacitors $C_{f1}$ and $C_{f2}$ which are connected across the load $R_L$ to provide a full wave doubler circuit, as explained above. The output across the load $R_L$ is taken across a pair of terminals 3 and 4 by the circuit $RE_1$ which provides input to the transistors $Q_1$ and $Q_2$ by way of the conductors 5, 6, 7, and 8.

In operation, a voltage is applied to the supply $S_1$ across the terminals 1 and 2. This voltage divides across capacitors $C_B$ and $C_C$ and is directed via the filtering network $C_1$ and $C_2$ and $L_1$ to the primary winding P. If the transistor $Q_1$ is turned on by a pulse at its base supplied by the regulator $RE_1$, the current passes through the transistor $Q_1$ and through the primary in a first direction. When the transistor $Q_1$ is disabled and the transistor $Q_2$ is enabled, current passes through the transistor $Q_2$ and the primary winding P in the opposite direction. Consequently, current of a form such as that shown in FIG. 4 is provided to the primary winding P. The current through the primary winding P induces a voltage in the secondary winding S in first and in second directions depending on the particular portion of the waveform at the primary winding P. Current in a first direction in the secondary winding S flows through the diode $D_3$ to the load $R_L$. Because of the values chosen for the capacitors $C_{f1}$ and $C_{f2}$ (0.1 microfarads), the voltage appearing across the load $R_L$ will be twice that across either of the capacitors $C_{f1}$ or $C_{f2}$. The voltage appearing across the secondary winding S in the opposite direction will be carried by the diode $D_4$ through the load $R_L$, again in the same direction.

As explained above and in the above-mentioned patent, the output of the load $R_L$ is sensed across the conductors 3 and 4 by the regulator $RE_1$ to provide the desired input pulses for driving the transistors $Q_1$ and $Q_2$.

Figure 3:
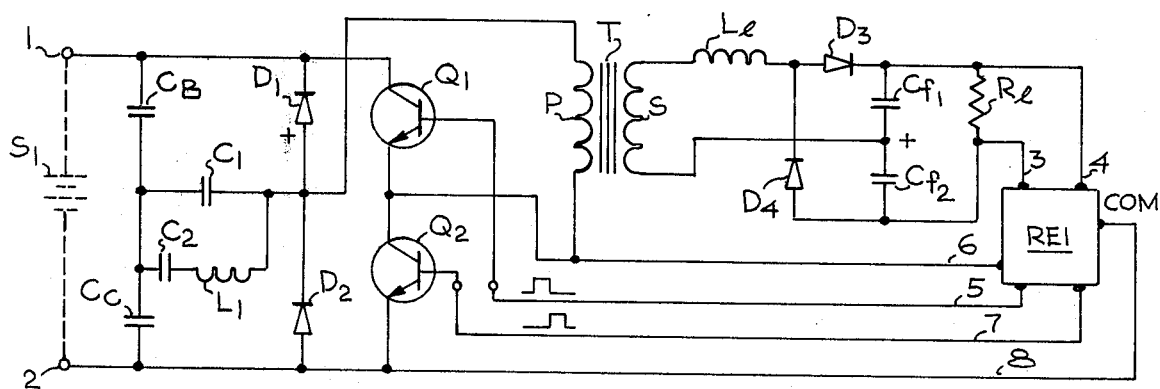
FIG. 3 is a circuit diagram of a second embodiment of a DC to DC converter constructed in accordance with the invention.

FIG. 3 illustrates a second embodiment of a DC to DC converter in accordance with the present invention. The configuration of FIG. 3 differs from that shown in FIG. 2 in that the capacitors $C_1$ and $C_2$ and the inductor $L_1$ are arranged in a slightly different filter configuration. In FIG. 3, the capacitor $C_1$ is connected in parallel with the capacitor $C_2$ and the inductor $L_1$ at the mid point between the capacitor $C_B$ and $C_C$ and the mid point between the diodes $D_1$ and $D_2$. If the values of the capacitors $C_1$ and $C_2$ and the inductor $L_1$ are appropriately chosen, the filter including these elements, the inductance of primary winding P and the reflected inductance $L_L$ of the secondary winding will be tuned to resonance at the primary frequency of operation of the configuration of FIG. 3 and at the third harmonic of that primary frequency. Consequently, the waveform of the current through the primary winding P will be essentially that shown in FIG. 4 for the configuration of FIG. 3. Thus, the configuration of FIG. 3 will also provide substantially greater average power to the output than do prior art DC to DC converters.

Particular values for the elements of the circuitry of FIGS. 2 and 3 are as follows:

$C_1$—0.2266 microfarads
$C_2$—0.3844 microfarads
$L_1$—26.62 microhenrys

Obviously, other values might be used to provide a DC to DC converter such as that described herein. Furthermore, various changes might be made in the form of the circuitry while retaining the inventive concept. For example, it would be possible to cause the current waveform to assume even more of a square wave shape by adding input circuitry resonant at the fifth, seventh, and additional odd harmonics of the primary frequency. Furthermore, the invention might be used with other arrangements such as that shown in co-pending patent application Ser. No. 914,755, filed June 21, 1978, now U.S Pat. No. 4,158,881, for eliminating current peaks at circuit turn on. Thus, while there have been shown and described preferred embodiments, it is to be understood that various other adaptations and modifications may be made which fall within the spirit and scope of the invention.

What is claimed is:

1. In a DC to DC converter having a transformer with a primary winding and a secondary winding, a pair of input capacitors for serial connection across a supply of input potential, switching means for causing current to flow selectively in opposite directions through the primary winding, a pair of diodes for limiting the voltage across the primary winding, a load, voltage rectifier means connecting the load to the secondary winding, and means responsive to the output across the load for controlling the switching means, the improvement comprising:
a two stage filter connected between the input capacitors and one side of the primary winding, the filter being tuned to a first frequency, equal to the desired switching rate of the switching means and to a second frequency equal to the third harmonic of the first frequency.

2. The invention as claimed in claim 1 in which the two stage filter comprises a first filter capacitor connected in series with a parallel circuit including a second filter capacitor and an inductor.

3. The invention as claimed in claim 1 in which the two stage filter comprises a first filter capacitor connected in parallel with a second filter capacitor and an inductor.

4. The invention as claimed in claim 1 in which the ratio of the impedance presented by the two stage filter to current at the first frequency with respect to the impedance to current at the third harmonic is between $\frac{1}{4}$ and 1/5.

* * * * *